US010565614B2

(12) United States Patent
Kilgore et al.

(10) Patent No.: US 10,565,614 B2
(45) Date of Patent: Feb. 18, 2020

(54) ADVERTISING WITH DIGITAL MEDIA CONTENT

(75) Inventors: Andrew Kilgore, Belfast (GB); Euan Pattullo, Perthshire (GB); Craig Mellor, Perthshire (GB); Philip Duncan, Dundee (GB)

(73) Assignee: NCR Corporation, Atlanta, GA (US)

( * ) Notice: Subject to any disclaimer, the term of this patent is extended or adjusted under 35 U.S.C. 154(b) by 531 days.

(21) Appl. No.: 12/953,594

(22) Filed: Nov. 24, 2010

(65) Prior Publication Data
US 2012/0130810 A1 May 24, 2012

(51) Int. Cl.
*G06Q 30/02* (2012.01)
(52) U.S. Cl.
CPC ..... *G06Q 30/0251* (2013.01); *G06Q 30/0241* (2013.01); *G06Q 30/0255* (2013.01)
(58) Field of Classification Search
CPC .................................... G06Q 30/02
USPC ............................................. 705/14
See application file for complete search history.

(56) References Cited

U.S. PATENT DOCUMENTS

| 2001/0029583 | A1* | 10/2001 | Palatov et al. ............ 713/193 |
| 2002/0046122 | A1* | 4/2002 | Barber .............. G06Q 10/087 705/17 |
| 2002/0103855 | A1* | 8/2002 | Chatani ............ G06F 17/30899 709/203 |
| 2002/0194065 | A1* | 12/2002 | Barel et al. ................. 705/14 |
| 2003/0149975 | A1* | 8/2003 | Eldering et al. ........... 725/34 |
| 2004/0093229 | A1* | 5/2004 | Plain ........................ 705/14 |
| 2005/0096978 | A1* | 5/2005 | Black ........................ 705/14 |
| 2005/0240958 | A1* | 10/2005 | Nguyen et al. ............ 725/20 |
| 2006/0271543 | A1* | 11/2006 | Dodson et al. ............ 707/9 |
| 2007/0055566 | A1* | 3/2007 | Gaughan .............. G06Q 30/02 705/14.55 |
| 2008/0207234 | A1* | 8/2008 | Arthur ................ G06Q 20/20 455/466 |
| 2009/0259552 | A1* | 10/2009 | Chenard ............. G06Q 30/02 705/14.72 |
| 2010/0125492 | A1* | 5/2010 | Lin et al. .................. 705/14.5 |
| 2010/0228591 | A1* | 9/2010 | Therani ............. G06Q 30/00 705/14.54 |

* cited by examiner

*Primary Examiner* — Vincent M Cao
(74) *Attorney, Agent, or Firm* — Schwegman, Lundberg & Woessner

(57) ABSTRACT

A method is provided for dynamically adding customized advertisements with media content on digital media storage devices. A user may provide identification data to an automated machine or salesperson selling the media content at a retail location. Based upon the identification of the user, advertisements may be selected to be added to the media content. The selection of advertisements may be based upon previous transaction data, the genre of the media content, or characteristics identified for the user. Users may also select to change the quantity of advertisements to view based upon fees paid by the user for the media content. The user may pay additional fees to view less advertisements and the user may pay fewer fees and have more advertisements included with the media content.

14 Claims, 3 Drawing Sheets

ADVERTISING WITH DIGITAL MEDIA CONTENT

FIELD OF THE INVENTION

The present invention relates, generally, to advertising.

BACKGROUND

Media content rented or purchased for viewing, such as on a DVD, often displays a number of advertisements before the menu is reached that allows a user to view the feature presentation. The advertisements presented may be for any number of different items, such as consumer products or services or upcoming films to be released in theaters or on digital media. Users may express frustration because they are compelled to watch these advertisements prior to viewing the feature presentation. Additionally, these advertisements may be for products, services, or content that the user has little or no interest. A poor consumer experience may lead users to avoid purchasing or renting movies from a particular studio or type of media simply in order to avoid the offending advertisements. As a result, methods to improve the advertisements presented prior to a feature presentation are very important.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques are described to provide advertisements that may be dynamically added to media content. The media content may be purchased or leased by a consumer. The advertisements may be added as the media content is being purchased by the user in a kiosk. The advertisements may also be added as media content is being burned or copied to a digital storage device in the case when the feature presentation is prepared upon purchase or lease by the user. Alternatively, advertisements may be added to media content streamed or downloaded over a network connection. The selection of the advertisements that are added to the media content may be based on a variety of factors including, but not limited to, rental history, previous transactional data, or demographic data. In another embodiment, the selection of advertisements may be based on the genre or subject of the media content leased or purchased.

In another embodiment, the media content may be burned or copied to a digital storage device with less advertising present or with a greater number of advertisements based upon the fees paid by the user. The media content may also be downloaded or streamed to a user over a network connection with the amount of advertising present based upon the fees paid by the user. A user may pay an additional fee so that no advertisements appear with the media content. In another embodiment, a user may pay a fee to reduce the number of advertisements that may appear prior to the feature presentation. In yet another embodiment, a user may pay reduced or no fees in return to view particular advertisements for products or services. In another embodiment, a user may pay reduced fees in return to view a greater number of advertisements for products or services.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
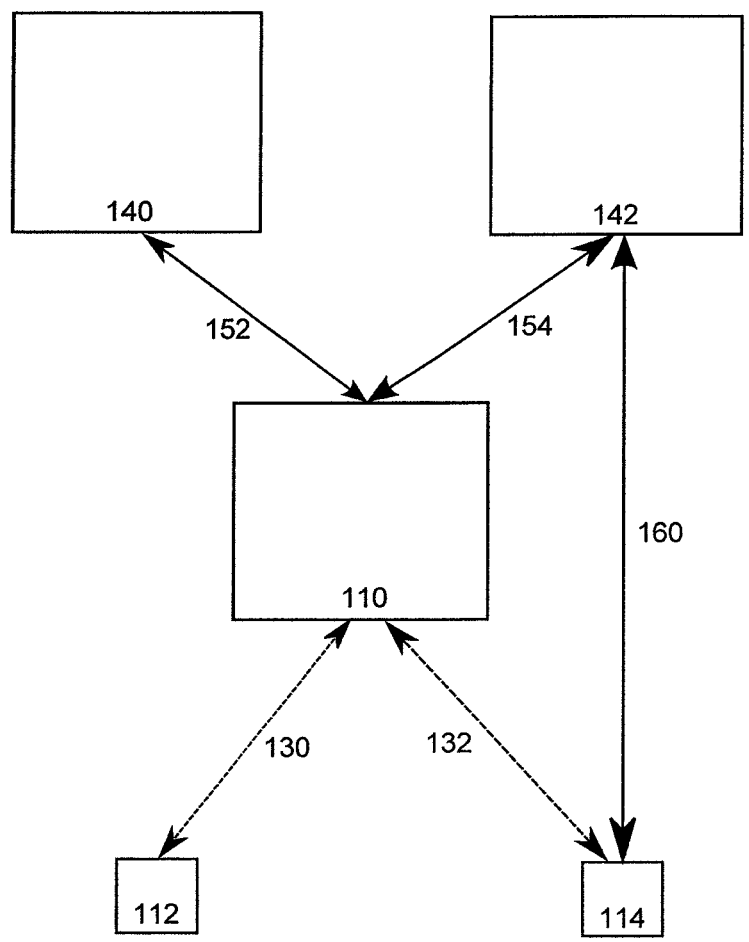
FIG. 1 is a block illustration of a system for providing customized advertising with media content on digital storage devices, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Methods and techniques are described to provide users with customized advertising added dynamically on media content that is streamed, downloaded, or stored on digital storage devices. When a user purchases or rents media content, advertisements are often displayed prior to the menu appearing in order to view a feature presentation. Currently, media content purchased or rented on digital storage devices, including but not limited to, digital versatile disc ("DVD"), universal serial bus ("USB") thumb drive, secure digital ("SD") card, memory card, solid state drive, hard drive, or flash drive, may preview upcoming films that are soon to be or recently released in theaters or digital storage media. However, the advertisements may have no correlation to the media content that has been purchased or leased. For example, an advertisement might be displayed for a romantic comedy film when the feature presentation is an action film. Under this circumstance, the genre of the advertisement and the genre of the feature presentation do not correlate leading to consumer dissatisfaction when viewing the advertisements. As another example, an advertisement might be displayed for women's clothing when the feature presentation is an action film. Under this circumstance, the content of the advertisement and the content of the feature presentation do not correlate leading to consumer dissatisfaction.

By customizing the advertisements that a user views prior to the feature presentation, the user experience is improved and advertising may be more effective. In an embodiment, the user may be identified and advertisements are selected, based upon characteristics of the user, to be added to the feature presentation.

Advertisements may be included with the media content regardless of the form, type of media, or delivery method used to deliver the media content to the user. For example, the user may purchase or lease the media content as a DVD or stored on a USB thumb drive. Alternatively, the media content may be delivered electronically via a download or as a video stream through a network connection. Any other method upon which media content may be delivered to a user may be used. Once the advertisements are selected, a kiosk or other computing device capable of storing advertisements on digital media is used to add the advertisements to the digital media storage device.

Advertisements may originate from the content provider or the digital media storage device provider. If the media storage device provider provides the advertisements, then the advertisements may be stored in a component as part of a device, such as a kiosk, that provides the media storage devices to users. The advertisements may be downloaded by the kiosk, uploaded via a central server to the kiosk, or may be physically brought to the kiosk in the form of a portable media storage device during a service call. Any other method that would deliver advertisements to the kiosk may also be used.

In an embodiment, the digital media may have a marker where advertisements may be added to the digital media. The marker indicates within the digital media, where the advertisements may be copied or stored. When digital media is purchased or leased, the kiosk may add the advertisements to the digital storage media as the user is purchasing or leasing the media content. The advertisements are added to the digital storage media at the site of the marker. The advertisements may also be added by any other type of device, such as that controlled by an employee of a retail outlet, at the point of sale.

In an embodiment, advertisements may be included in the digital media in the form of a link to retrieve particular content over a network. For example, a hyperlink may be added to media content on digital media so that when a user begins playing the digital media, the content that the hyperlink references is displayed to the user prior to the feature presentation. In an embodiment, the advertisement in the form of a media file is stored on the digital media. When the digital media is played, the player displays the advertisement stored on the digital media prior to playing the feature presentation.

The addition of customized advertisements may present additional revenue streams for the entity that is able to sell the advertisements that may be any of, but not limited to, the service operator of the kiosks, the content provider, or the digital storage media delivery provider.

The customized advertisements may be attractive to companies whose products are placed in the media content. For example, for the feature presentation, "Cast Away" where Federal Express was prominent in the story line, the company Federal Express may wish to place additional advertisements that may be viewed prior to the feature presentation. In addition, the advertisements may be interactive or include further information such as informing the user where the product may be purchased or the price of the product. This further information may be obtained and updated using a network connection and a link to the further information.

In another embodiment, a user may elect to pay a premium price in order to not have any or fewer advertisements, included with the media content. In yet another embodiment, a user may elect to view additional or particular advertisements, in order to lower the price of the media content. For example, a particular advertiser might be launching a new product and wish for as many viewers as possible to view the advertisement and thus the advertiser is willing to pay a premium for viewers to watch the advertisement.

By allowing advertising to be customized dynamically for media content at the time of purchase, advertising may be made more effective to users. In addition, allowing users to increase or decrease the amount of advertising content with media content based upon what the user is willing to pay allows additional revenue streams for the content or service provider while also allowing the user more choice about the advertising included with his or her purchase.

Identifying a User Upon Purchase

In an embodiment, the user who purchases or leases the media content is identified in order to customize the content or type of advertisements that are included or added onto the media content. The user may be identified using a variety of methods. In an embodiment, a user may be identified based upon a token. The token may take multiple forms. For example, the token may be an RFID attached to a customer loyalty card or a near field communication (NFC) tag in a mobile device. An antenna from the content delivery system would receive the signal transmitted by the token to help identify the user. The signal may contain an identification number or identification data that enables the ordering system to identify the user to the system.

In an embodiment, a user may scan or swipe an identification card for identification of the user to the system. For example, a loyalty card might have a bar code that is able to be scanned via an optical scanner. In another example, the loyalty card has a magnetic strip that might be swiped on a terminal in order for information to be read from the loyalty card. Data on the identification card is used to identify the user.

In an embodiment, the user may self-identify based on entering a username or other type of identifier. For example, prior to ordering the media content, the user may enter a username or other identification data (e.g., telephone number, etc.) in order for the user to identify their self to the system. In an embodiment, cameras may be used to identify users by an optical or biometric scan. Any other type of method upon which identifying an individual may be used to perform identification.

In an embodiment, user identification may occur either locally at a touch-based computing device or kiosk, a retail outlet, or remotely through a server. The touch-based computing device may store user identification data locally so that the user may be quickly identified once the identification data is received. The touch-based computing device may also send the user identification data to a server to identify the user if the touch-based computing device does not store any identification data or the user is not readily identified by the local touch-based computing device (that may occur where a customer has ordered at other kiosks of the content delivery provider but not at the currently used kiosk).

Selecting Customized Advertisements

In an embodiment, once a user has been identified, advertisements are selected for the particular user based upon a variety of factors, including, but not limited to, particular characteristics of the user, the demographics of the user, the previous transaction history of the user, or preferences submitted by the user. For example, a user who is male and is in his early 30s might arrive at a kiosk, enter identification data, and select an action adventure movie to lease. Based upon the demographics of the user (e.g., age, gender, etc.), transaction details (e.g., geographic location of purchase/lease, time of day, day of year, other titles also purchased/leased, previous transaction data, etc.) and the genre of the movie selected, a film trailer for an upcoming action adventure movie might be one advertisement that is selected to be added to the media storage device upon which delivery of the media content to the user occurs. Another advertisement selected may be for an alcoholic beverage or for a sporting event.

In an embodiment, the advertisements that are added may be based at least in part upon previous transaction data of the particular user. For example, a user might be an avid fan of science fiction movies and primarily rents or purchases content within the genre of science fiction. In this circumstance, when this user is identified as purchasing/renting media content, the customized advertising selected is expected to appeal to a fan of science fiction. The advertising may include other science fiction feature presentations, television shows that fall within the genre of science fiction, or other content that is related to science fiction, such as fantasy or honor.

In an embodiment, previous transaction data may be limited by considering transaction data only from the particular user. In another embodiment, previous transaction data may be considered in aggregate with the particular user and a subset of other users. A particular user may select a preference that all of the particular user's previous transactions data are to remain private. Under this circumstance, previous transaction data of an aggregate of users might be considered for the selection of customized advertisements, but the particular user's previous transaction data is not used in any way.

In an embodiment, a minimum amount of transaction data may be required prior to the transaction data being used to customize a menu for a particular user. For example, the business may require that the user visit the store at least two previous times in order to have adequate information to present preferred menu items. The amount of data or number of visits may vary from implementation to implementation.

In an embodiment, transaction data based on other characteristics may be used in order to present more customized advertising. For example, if there are children that are identified, advertising with children's meals may be offered. Customized advertising may be offered based on the age of the user or any other identifiable characteristic that may help in offering customized advertising.

In an embodiment, advertising may also be tailored based on the geography of the store or any other factor. For example, advertising may vary based upon the time of year. For example, milkshakes or cold drinks might be selected in the summer. Warm drinks and coffee might be selected in the winter. In an embodiment, advertisements might also be tailored based upon the geography. For example, local department stores or specialty retailers located close to the point of purchase might be selected as advertisements.

In an embodiment, when a user makes a lease or purchase, the transaction data from the order is stored and linked to the particular user. The transaction data may be aggregated with transaction of other users to find correlations or similar demographic data in order to find additional selections of advertisements. Aggregated transaction data may be used for users who do not yet have adequate transaction data or do not wish for their individual transaction data to be used with the user interface.

Providing Digital Media Storage Devices with Advertising

In an embodiment, when the advertisements are determined, the advertisements are stored or burned onto the digital media storage devices that contain the feature presentation at the site of the marker that indicates where to store the advertising. The advertisements may be stored at the kiosk or be sent over a network connection to the kiosk for adding to the digital media storage device. Advertisements stored on the kiosk may be updated via a network connection or changed periodically when regularly scheduled service is performed on the kiosk.

In an embodiment, the advertisements may be stored as a digital media file that may be played on the same playback device as the feature presentation. In another embodiment, the advertisements may be stored as a link that indicates retrieval should be made over a network by the playback device. For example, a Blu-Ray™ DVD player might have a connection to the Internet. Under this circumstance, when the Blu-Ray™ DVD player encounters the link on the digital media storage device (a Blu-Ray™ DVD in this case), the link instructs the Blu-Ray™ DVD player to retrieve the media on the Internet indicated by the link. The link may indicate any type of resource such as a commercial that may be streamed to the player, a web page, or a Flash animation that contains the advertisement. By using links rather than storing advertising as a digital media file results in advertisements that may be updated to include the most current information or advertisement and be interactive so that users may indicate that they wish further information or to have more details. However, not all media players will include a network connection, or the network connection present may be too slow, indicating situations where use of links are not ideal.

In an embodiment, when the media content is streamed, advertisements are streamed prior to the feature presentation. Thus, a user would purchase or lease the media content, and customized advertisements are shown prior to the showing of the feature presentation.

In an embodiment, the amount of advertising shown may be increased or decreased based upon the purchase price of the media content paid. For example, a user may wish for no advertisements at all to be included with his DVD purchase of a movie. For an additional fee of two dollars (to compensate for the lost advertising revenue the provider would otherwise receive), the user may receive the media content with no advertising included at the time of purchase or lease.

In another example, the user may wish to pay as little as possible. Under this circumstance, the user may opt to have extra advertisements included with his media content purchase. Six advertisements may be included rather than a standard four advertisements, for example. In exchange for extra advertising included, the user might pay one dollar less than the standard price of the media content.

In an embodiment, the user may select particular advertisements that increase or decrease his fees for the media content. For example, a company might be launching a brand new product aimed for a young male demographic and the company wishes for as many persons in that demographic to view particular advertisements regarding the product. The company may agree to pay extra fees for users to view the particular advertisements as long as the users are within the demographic. When a user within that demographic purchases media content and he is identified as belonging to that demographic, the user may be given the option to select that particular advertisement and pay less in fees for the media content. The user might also be given the option to view that particular advertisement and no other advertisements (thus viewing only one advertisement, rather than a standard greater number of advertisements) and pay standard fees for the media content. Thus, the choice is given to the user as to what advertisements may be shown and the number of advertisements shown and the fees for the media content are reflective of their choices.

In yet another embodiment, advertisements may be shown only once (the first time the DVD is played) if a premium price is paid for the media content. In other embodiments, the number of times advertisements are displayed may vary based upon the fees paid by the user. For example, for an extra fee of two dollars, advertisements might be shown on three subsequent showings. For an extra fee of three dollars, advertisements might be shown only on the initial viewing of the media content.

In another embodiment, if a user clicks on an advertising link, then the transaction fee may also be reduced. The transaction fee may also be reduced if a user makes a purchase having followed an advertising link. Because clicking on a link or making a subsequent purchase will not occur until after the lease or purchase is made, the reduction in transaction fees may occur as a credit to the credit or debit card used to make the purchase or a voucher or savings code that may be applicable to a future purchase or lease of content.

In yet another embodiment, customized advertising may also add the ability to provide printable media (e.g. discount coupons or codes) as part of a targeted marketing campaign. For example, when media content is played on a suitable device (e.g. Personal Computer, or media player connected to a network with a printing device), the user might be given the option to print additional information or discount coupons that may be used for a future purchase.

Illustrated Examples

A system that is able to store customized advertisements or links to advertisements dynamically added to digital media storage devices is illustrated in FIG. 1. In FIG. 1, a request is made at kiosk 110 to purchase or lease media content. Based upon the request, a user is identified. Based upon the identification of a user, the kiosk or a remote server may determine advertisements for the user that should be dynamically added to the digital media storage device. The advertisements may be provided remotely via connection 152 to content provider 140 or network connection 154 to kiosk service provider 142. The user may have the option to select the amount of advertisements that are stored or burned on the digital media storage device based upon fees offered to the user. In an embodiment, kiosk 110 may burn or store the customized advertising as media files stored at a marker on the DVD. Once the kiosk 110 completes storing the advertising on the DVD, the DVD is taken 130 to DVD player 112 which displays the media content and customized advertising to the user without any further assistance. In another embodiment, the DVD may include links to advertising burned or stored on the DVD at a marker. Under this circumstance, the DVD with links and media content is taken 132 to DVD player 114 that is capable of making a network connection with outside servers. In this example, DVD player connects 160 with kiosk service provider 142 which dynamically streams customized advertising content to DVD player 114 for display to the user.

Figure 2:
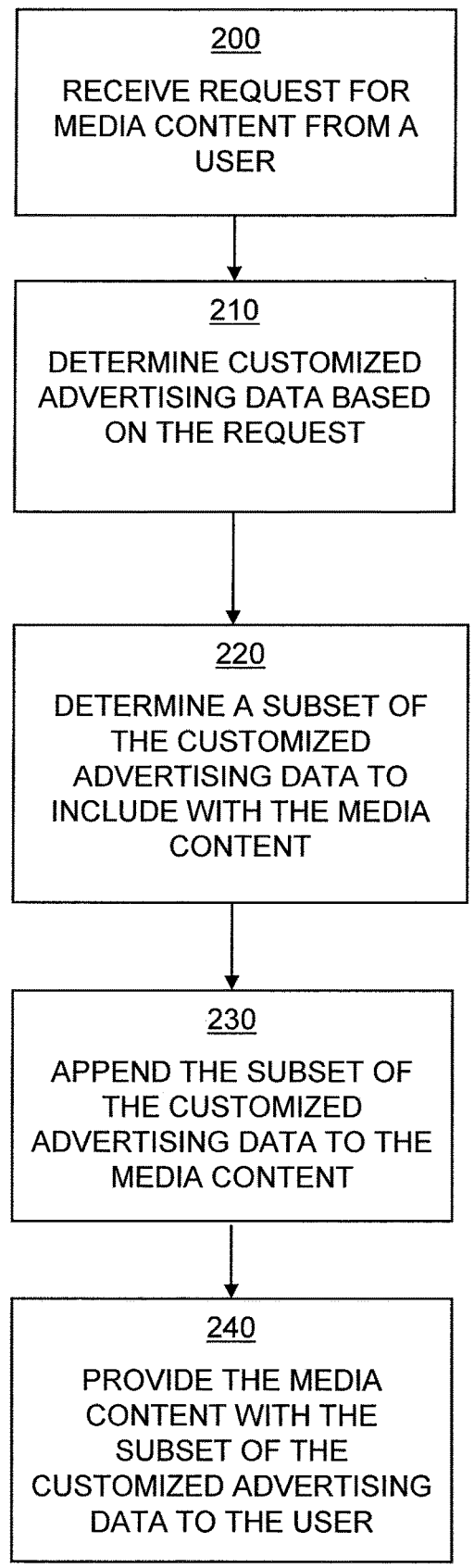
FIG. 2 is an illustration of a workflow for providing customized advertising for media content on digital storage devices, according to an embodiment of the invention.

An illustration of the workflow for providing customized advertising with digital media content is shown in FIG. 2. In step 200 of FIG. 2, a request is received from a user for media content. The user may be identified based upon identification data or any other way in which to identify the user. In step 210, customized advertising data is determined based on the content of the request. In other embodiments, the customized advertising may be determined based upon the identification and characteristics of the user or a combination of these and other factors.

In step 220, a subset of the advertising data is determined to be burned or stored with the media content. The size of the subset may be based upon the amount of fees selected by the user or may be based at least in part on the selections of which advertisements the user selects. When the subset of the advertising data is determined, the subset is appended to the media content in step 230. The advertising data may be burned or stored as media files on the digital media upon which the media content is stored at a marker on the digital storage device. Alternatively, the advertising data may be included as links that must be retrieved upon playback by the media content player. Finally in step 240, the media content with the appended advertising data is provided to the user. This may be performed by the kiosk that provides the DVDs or any other device that provides the media content to the user.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
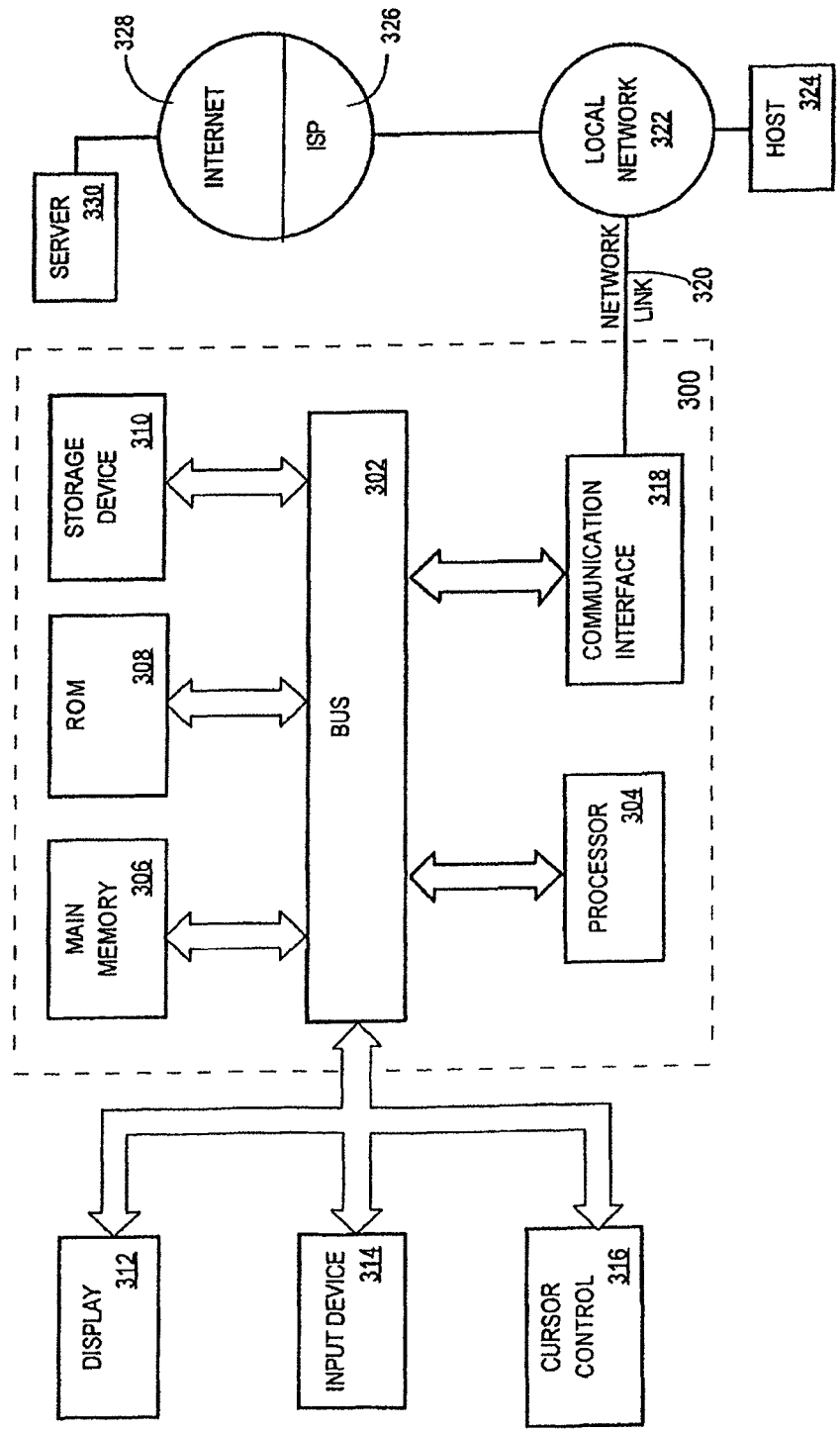
FIG. 3 is a block diagram of a system on which embodiments of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving, by a kiosk, a request from a user to purchase media content at the kiosk;
   identifying, by the kiosk, the user based on reading, by the kiosk, a Near Field Communication (NFC) tag in a mobile device operated by the user at the kiosk, wherein the NFC tag includes a user identification number for the user;
   determining, by the kiosk, customized advertising data, based upon: the request for the purchased media content, rental history of the user, preferences of the user, demographics of the user, previous transaction history of the user, geographic location of the request for purchase, time of day of the request for purchase, and a genre associated with the media content, wherein determining further includes acquiring the customized advertising data from advertisement data on a storage device of the kiosk;

permitting, by the kiosk, the user to adjust a price for the media content based on including additional user-selected and particular advertising content within the media content;
detecting, by the kiosk, markers present in the media content;
adding, dynamically by one or more computing devices of the kiosk and at a time of purchase by the user, a subset of the customized advertising data at locations within the media content identified by the detected markers as a hypertext link that retrieves the customized advertising data over a network when the media content is played, wherein the media content is stored on transportable digital media storage, wherein adding further includes burning the subset of the customized advertising data at the location identified by the detected markers onto the transportable digital media storage; and
delivering, by the kiosk, the media content with the subset of customized advertising data to the user with the transportable digital media storage.

2. The method of claim 1, wherein the media content includes motion pictures, television programs, sporting events, music, video games, or concerts.

3. The method of claim 1, wherein the customized advertising data determined is based at least in part on previous transaction data of the user.

4. The method of claim 1, wherein the customized advertising data determined is based at least in part on previous transaction data of an aggregate of users.

5. The method of claim 1, wherein a quantity of customized advertising data in the subset of customized advertising is based on a purchase price selected by the user.

6. The method of claim 1, wherein transportable digital media storage comprises at least one of:
an SD card, a USB flash drive, a portable hard drive, a DVD, a CD, or a solid-state drive.

7. A method comprising:
identifying, by a kiosk, a user based upon user identification data from a request for media content, the user identification achieved by reading a Near Field Communication (NFC) tag in a mobile device operated by the user at the kiosk, wherein the NFC tag includes a user identification number for the user;
determining, by the kiosk, customized advertising data, based upon:
the user, the request for the media content, rental history of the user, preferences of the user, demographics of the user, previous transaction history of the user, geographic location of the request for purchase, time of day of the request for purchase, and a genre associated with the media content, wherein determining further includes acquiring the customized advertising data from advertisement data on a storage device of the kiosk;
displaying, from the kiosk and to the user, a quantity of advertisements that may be added based upon a purchase price of the media content;
permitting, by the kiosk, the user to adjust a price for the media content based on including additional user-selected and particular advertising content within the media content;
detecting, by the kiosk, markers within the media content;
adding, dynamically by one or more computing devices of the kiosk and at a time of purchase by the user, a subset of the customized advertising data the within the media content at locations identified by the detected markers with the quantity of advertisements based upon the purchase price selected, wherein adding further includes providing the customized advertising data in the media content at the locations as hypertext links that retrieve the customized advertising data over a network when the media content is played, wherein the media content is stored on transportable digital media storage, wherein adding further includes burning the subset of the customized advertising data at the location identified by the detected markers onto the transportable digital media storage; and
delivering, by the kiosk, the media content with the subset of customized advertising data to the user with the transportable digital media storage.

8. The method of claim 7, wherein the quantity of advertisements is none.

9. The method of claim 7, wherein the customized advertising data determined is based at least in part on previous transaction data of the user.

10. The method of claim 7, wherein the customized advertising data determined is based at least in part on previous transaction data of an aggregate of users.

11. A method comprising:
receiving, by a kiosk, a request for media content from a user at the kiosk;
identifying, by the kiosk, the user based on reading, by the kiosk, a Near Field Communication (NFC) tag in a mobile device operated by the user at the kiosk, wherein the NFC tag includes a user identification number for the user;
retrieving, by the kiosk, customized advertising data, based upon: the user, the request for the media content, rental history of the user, preferences of the user, demographics of the user, previous transaction history of the user, geographic location of the request for purchase, time of day of the request for purchase, and a genre associated with the media content, and acquiring the customized advertising data from advertisement data on a storage device of the kiosk;
displaying, from the kiosk and to the user, a type of advertisement that may be added based upon a purchase price of the media content;
permitting, by the kiosk, the user to adjust a price for the media content based on including user-selected and particular additional advertising content within the media content;
detecting, by the kiosk, markers within the media content;
adding, dynamically by one or more computing devices the kiosk and at a time of purchase by the user, a subset of the customized advertising data within the media content at locations identified by the detected markers with the quantity of advertisements based upon the type of advertisements selected, wherein adding further includes providing the customized advertising data in the media content at the locations as hypertext links that retrieve the customized advertising data over a network when the media content is played, wherein the media content is stored on transportable digital media storage, wherein adding further includes burning the subset of the customized advertising data at the location identified by the detected markers onto the transportable digital media storage; and
delivering the media content with the added subset of customized advertising data to the users with the transportable digital media storage.

12. The method of claim 11, wherein the quantity of advertisements is none.

13. The method of claim 11, wherein the customized advertising data determined is based at least in part on previous transaction data of the user.

14. The method of claim 11, wherein the customized advertising data determined is based at least in part on previous transaction data of an aggregate of users.

* * * * *